United States Patent [19]

Yant et al.

[11] Patent Number: 4,904,461

[45] Date of Patent: Feb. 27, 1990

[54] SAFE PRODUCTION OF CHLORINE DIOXIDE IN A PRESSURIZED GASEOUS STATE

[75] Inventors: Robert E. Yant, Medina; Thomas S. Sturik, Garfield Heights, both of Ohio

[73] Assignee: Quantum Technologies, Inc., Twinsburg, Ohio

[21] Appl. No.: 129,060

[22] Filed: Dec. 7, 1987

[51] Int. Cl.$^4$ .............................................. C01B 11/02
[52] U.S. Cl. .................................................... 423/478
[58] Field of Search ...................... 423/478, 480, 479

[56] References Cited

U.S. PATENT DOCUMENTS

| | | | |
|---|---|---|---|
| 3,524,728 | 8/1970 | Westerlund | 423/478 |
| 3,864,457 | 2/1975 | Hoekje et al. | 423/480 |
| 3,950,500 | 4/1976 | Jaszka | 423/480 |
| 4,496,534 | 1/1985 | Delaney et al. | 423/576.2 |
| 4,508,537 | 4/1985 | Fenton et al. | 423/576.2 |
| 4,534,952 | 8/1985 | Rapson et al. | 423/478 |

FOREIGN PATENT DOCUMENTS

| | | | |
|---|---|---|---|
| 656486 | 1/1963 | Canada | 423/478 |
| 2917132 | 11/1980 | Fed. Rep. of Germany | 423/478 |

*Primary Examiner*—Jeffrey E. Russel
*Attorney, Agent, or Firm*—Arthur S. Collins

[57] ABSTRACT

A safe continuous process is disclosed for generating superatmospheric pressure mixtures of chlorine and chlorine dioxide, wherein the chlorine dioxide is generated in situ by chemically reducing inorganic chlorates in aqueous sulfuric acid solutions, and most of the chlorine is supplied from a high-pressure external source. The mixed gaseous products contain $Cl_2$ and $ClO_2$ in volumetric $Cl_2/ClO_2$ ratios of at least 10/1, and preferably between about 11/1 and 99/1, and are ideally suited for direct use in various industrial treatments, notably in the purification and bleaching of wood pulp and the like.

20 Claims, 3 Drawing Sheets

SAFE PRODUCTION OF CHLORINE DIOXIDE IN A PRESSURIZED GASEOUS STATE

This invention is concerned with process and apparatus for safely producing chlorine dioxide in a pressurized gaseous form. More particularly, it is directed to methods of continuously generating pressurized gaseous mixtures of chlorine dioxide highly diluted with chlorine and to dependable apparatus for the conduct thereof. The resulting gaseous mixtures are ideally adapted for direct use in certain industrially practiced treatments, with special emphasis on such operations as the purification and bleaching of wood pulps and similar fibrous raw materials.

BACKGROUND OF THE INVENTION

Chlorine dioxide is an unusual, nominally gaseous, chemical compound (b.p.=11° C. @ 1 atm), which exhibits desirable reactive properties for industrial applications involving several different important raw materials, such as the purification of water and other liquids and the bleaching of fibrous solids, especially wood pulps. However, due to its inherent chemical instability, chlorine dioxide cannot be stored or shipped satisfactorily for meeting normal commercial needs. Instead, it is generally produced as needed at or adjacent to the particular treatment facility in question.

In most such industrial installations, chlorine dioxide is generated by chemically reducing a metal chlorate in a strong acidic aqueous solution. Among the most prominent of the reducing agents currently employed for this purpose are chloride ion ($Cl^-$), sulfur dioxide and methanol. Similarly, sodium chlorate is the most common chlorate raw material, while sulfuric and/or hydrochloric are the major acids of general choice. Regardless of the specific combination of reactants chosen, the chlorine dioxide producing reaction is always conducted with the utmost care to avoid the formation of potentially explosive mixtures thereof. Thus, not only are moderate reaction temperatures (typically about 20° to 80° C.) carefully maintained, but also the partial pressure of chlorine dioxide in the gas phase evolved is rigorously limited, e.g. by operating the generator at a substantial vacuum (thus reducing total pressure while also increasing the proportion of water vapor evolved) and/or by the use of an inert gas sweep such as air to reduce the $ClO_2$ concentration in the gaseous mixture evolved. The general reliance upon such safety measures in the achievement of practical large scale production of $ClO_2$ is documented in many prior art disclosures, of which U.S. Pat. Nos. 3,446,584, 3,864,456 and 3,933,987 are representative.

Unfortunately, the highly diluted, low pressure gas mixtures of $ClO_2$ obtained by observing these customary safety precautions represent such an extended, bulky and voluminous form of $ClO_2$ that further extensive handling or direct use thereof is unduly difficult and generally uneconomic. As a practical matter, therefore, in most state of the art procedures for continuous, on-site production of chlorine dioxide, the diluted, low pressure gas mixtures initially generated are promptly contacted with a stream of chilled water to effect absorption and dissolution therein of most of the chlorine dioxide. (See, for example, U.S. Pat. Nos. 2,881,052, 4,075,308 and 4,251,224.) Although the resulting aqueous solutions are quite dilute (containing e.g. about 5 to 10 grams of $ClO_2$ per liter), they still represent a more compact and convenient form of $ClO_2$, which can be handled with reasonable safety and economy.

BRIEF SUMMARY OF THE INVENTION

The principal objective of the invention is to provide a safe, reliable, and economical process for producing chlorine dioxide in a stable, pressurized gaseous form suitable for direct transfer and use in continuously conducted industrial treatments, e.g. in purifying, delignifying and bleaching wood pulps. A further objective is to synthesize a complete, compact apparatus for efficiently generating gaseous chlorine dioxide from inorganic chlorate continuously and dependably at superatmospheric pressures.

A more specific object contemplated herein is the continuous production of said pressurized chlorine dioxide as a mixture with much larger, but desirable coagent proportions of chlorine to provide a superatmospheric pressurized gaseous reagent capable of being transmitted directly to a pressurized pulp treatment zone and introduced thereto under its own pressure to effect the desired treatment. Additional objects of the present invention and particular advantages provided thereby will be elucidated in the detailed description and discussion which follow:

In accordance with our invention, the primary objectives and advantages recited above can be accomplished by continuously generating chlorine dioxide from an inorganic chlorate by reducing same in a strongly acidic aqueous solution by means of an effective chemical reducing agent in a suitably configured reaction zone at moderate reaction temperatures (i.e. less than 100° C.), and under generally accepted conditions with the following major exceptions:

(1) Said reaction zone is maintained at substantial superatmospheric pressures, i.e. not less than about 7 psig and preferably at least about 14 psig.

(2) Substantially pure, pressurized chlorine gas is continuously fed to said reaction zone at a rate at least about ten times the chlorine dioxide production rate to produce a superatmospheric pressurized gaseous product consisting essentially of chlorine and chlorine dioxide, e.g. carrying only saturation levels of moisture and largely free of inert permanent gases such as air, nitrogen, carbon dioxide and the like. To this end, some organic reducing agents (like oxalic acid) which release considerable quantities of carbon dioxide are not recommended as major reactants and any appreciable entrainment of inert gases, like air should be avoided.

Undoubtedly, some of the known chlorine dioxide generation equipment could be adapted to superatmospheric pressure duty and modified to provide enough gas/liquid feeding, mixing, separating, and other needed fluids handling capabilities for them to be used with some success in carrying out the present invention. However, we have found that the locus for introducing fresh reactants and the manner in which the highly pressurized chlorine gas is fed and distributed through the aqueous reaction medium can seriously affect both the chlorate conversions and chlorine dioxide yields attained from a given aqueous reaction mixture. Therefore, in order to obtain optimum results from the present invention, a unique, customized apparatus assembly has been devised for use in conducting our process. A full discussion of this customized apparatus will be presented in the "Preferred Embodiments" section hereinbelow, using accompanying drawings for illustration.

BROAD DESCRIPTION OF THE INVENTION

Because of its excellent solubility, reasonable cost and availability, sodium chlorate is almost always the favored metal chlorate employed to generate chlorine dioxide industrially. However, chlorates of other metals (such as potassium and magnesium), which have good solubility characteristics in aqueous mineral acid solutions, can readily be used also. The mineral acids of principal interest are sulfuric, hydrochloric and phosphoric, with mixtures thereof being satisfactory in some cases.

The teachings of the present invention can be applied with advantage in the chemical reduction of a suitable chlorate raw material dissolved in concentrations between about 0.1 and about 3.0 molar in $ClO_3^{31}$ in the customary strong mineral acid solutions (e.g. those at acid concentrations between about 4 and 14 normal) regardless of the particular reducing agent(s) employed. Likewise, the reduction reaction can be carried out in the presence of one or more of the established catalysts, if desired.

The chemical reducing agents of greatest interest in the present invention are chloride ion, sulfur dioxide and methanol. Of these, methanol is least attractive due primarily to the probability of toxic or otherwise undesirable by-products being formed, such as chlorinated alkyls and, of course, some carbon dioxide. Accordingly, the most preferred reducing agents herein are chloride ion and sulfur dioxide. Indeed, these two reducing agents are particularly attractive with regard to their potential roles herein vis-a-vis the large amounts of chlorine employed. Thus, chloride ion and chlorine are quite compatible and essentially unreactive together. On the other hand, sulfur dioxide is very reactive toward chlorine, but, in the presence of water, the resulting reaction product is a mixture of $H_2SO_4$ and HCl, thereby creating, in-situ, supplements of both chloride ion and strong acids. Accordingly, a combination of sulfur dioxide and chloride ion is not only entirely feasible, but, actually represents a very flexible approach to supplying the reducing agent requirements of the invention and one which can provide further benefits as well, e.g. in reducing make-up acid requirements and/or in regulating reaction temperature, etc.

In the continuous generation of $ClO_2$ by chemically reducing metal chlorates, a number of reaction systems have been employed ranging, for example, from a single vessel configured to provide one or more reasonably well defined reaction zones therein to two or more separate reaction vessels arranged in sequential (e.g. cascade) fashion. As illustrated by the prior art patents already cited herein, reliance upon a single vessel reactor containing a large "unilocular" reaction zone is a popular concept used commercially in this art. See, for example, U.S. Pat. No. 3,933,987, especially the illustrative drawing and the description of same in column 5 thereof. The usual practice in operating such a large "unilocular" reaction vessel is to establish an aqueous reaction mixture therein and then maintain the desired equilibrium concentration of each of the several reactants therein by continuously feeding each in appropriate concentrations and amounts taking into account the rate of reaction and the rate at which products and by-products are removed. Mixing action within said aqueous reaction mixture can be provided in a variety of ways, but is preferably achieved by the turbulence generated by the inflowing reactants and particularly by the diluent gases added, such as air or steam or those internally generated (e.g. volatilized water vapor). Overall, gross mixing is often further improved by the withdrawal of liquid from the lower part of the unilocular reaction vessel and return of at least part of same to a higher level therein (with or without interim separation and recovery of byproduct salts therefrom).

The present process can be carried out satisfactorily in an aqueous liquid reaction mixture maintained at desired reactant equilibrium concentrations in a modified (superatmospheric) unilocular reactor similar to those operated at atmospheric pressure or below, as shown in said prior art. Of course, any reactor used herein must include special equipment for handling the large volumes of pressurized chlorine gas that we employ. In any case, our unique, customized apparatus (to be described later) performs with greater efficiency and dependability to produce higher yields of $ClO_2$ in the form of pressurized gaseous mixtures of desired composition and purity.

DETAILED DESCRIPTION OF INVENTION

Figure 1:
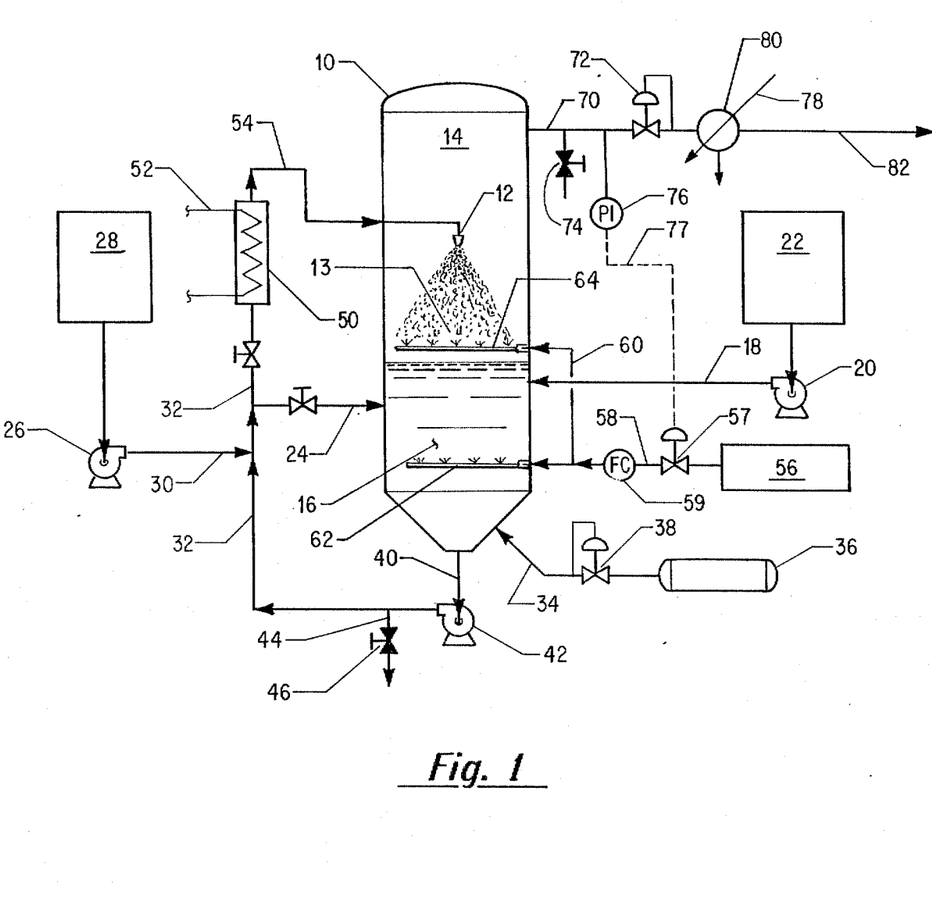
FIG. 1 is a schematic flow diagram of one embodiment of the present invention based upon use of a modified single vessel type of reactor for the continuous production of superatmospheric pressurized mixtures of chlorine and chlorine dioxide.

Referring now to FIG. 1, the generalized operation of our basic process using a modified single vessel type of reactor is shown. In this drawing, the modified reactor is an enclosed, elongated, columnar vessel 10 constructed to withstand substantial superatmospheric pressures and having a free space 14 in the top section thereof and a reservoir 16 of reaction liquid in the bottom thereof. Space 14 and reservoir 16 are each at least 2 feet, and preferably 3 feet or more, in height (each occupying around one-third of the total height of vessel 10). Space 14 serves primarily as a separation zone for removing entrained liquid from the gaseous product generated, while reservoir 16 serves as the main residence zone for the acidic solution of chlorate being reduced to form $ClO_2$.

A body of acidic chlorate solution is initially established in reservoir 16 by feeding the respective reactants thereto in desired proportions and concentrations. Thus, in FIG. 1, a strong acidic solution is delivered through conduit 18 via pump 20 from storage tank 22, while chlorate solution is delivered from storage tank 28 through conduit 24 via pump 26 and connecting lines 30 and 32. The strong acid solution from tank 22 will usually comprise mainly sulfuric acid but may contain some HCl. Likewise, the chlorate solution from tank 28 may contain some chloride ion. If the amount of $Cl^-$ reducing agent contained in the combined streams of chlorate solution and strong acid solution is insufficient to accomplish the desired reduction of chlorate to $ClO_2$, reducing agent can, of course, be independently fed to modified reactor 10 as needed. For example, a gaseous reducing agent, such as $SO_2$ or HCl, can be introduced through line 34 via control valve 38 from storage cylinder 36. Alternatively, a chloride solution can be independently introduced from a separate storage tank (not shown) in an analogous manner to the chlorate solution from tank 28.

Modified reactor 10 is provided at the bottom with a liquid discharge conduit 40 leading to recirculation pump 42 for recycling the strong acid solution of chlorate via conduit 32 to the upper regions of said reactor 10 via heat transfer device 50 and conduit 54. This permits the liquid reaction mixture to be heated or cooled via appropriate heat transfer fluid circulating through coil 52 as said mixture is recycled to the upper space 14 in reactor 10, and, thus, provides a convenient means for regulating the reaction temperature of the process. Conduit 54 leads into reactor 10 at least about 2 to 3 feet below the top thereof, so as to deliver the recycled liquid reaction mixture into a suitable means for effecting good liquid/gas contacting with the large volume of pressurized chlorine gas fed to reactor 10 from external supply tank 56. In FIG. 1, said means is shown in the form of one or more downwardly directed atomizing nozzles 12, designed to provide a spray pattern 13 covering substantially the entire cross-section of vessel 10. Alternatively, conduit 54 could deliver recycled reaction liquid to the top of a packed bed of loose inert solids (not shown) in order to effect the desired countercurrent liquid/gas contacting with said pressurized chlorine gas.

Superatmospheric pressure chlorine gas is supplied from tank 56 via conduit 58 and manifold 60, connecting through fittings mounted in the side wall of reactor 10 at two different levels to sparger plates 62 and 64 having upwardly directed discharge openings therein. Upper plate 64 is located just above the top of liquid reaction mixture in reservoir 16, while plate 62 is located at abount mid-depth in said reservoir. Conduit 58 contains a pressure reducing valve 57 and flow control device 59 so that the pressure and total flow rate of pressurized chlorine gas introduced into modified reactor 10 can be regulated. Reactor 10 is also provided near the top thereof with gaseous discharge port 15 opening into conduit 70 for egress of the pressurized gaseous product therefrom. This conduit 70 contains a back pressure control valve 72 preceded by a gas sampling tap 74 and a pressure sensing and indicating device 76, the signal 77 from which can be used to monitor and adjust reducing valve 57 in order to maintaina proper chlorine gas feed pressure in conduit 58. A condenser 80 with indirect cooling fluid line 78 passing therethrough is also shown downstream of control valve 72 in gaseous discharge conduit 70. However, this is only an optional accessory device which can be used, if desired, to remove (by condensation) some of the moisture content in the pressurized gaseous product generated before it is delivered to the ultimate end-use application via extension conduit 82.

After reservoir 16 has been filled to the desired level (somewhat below plate 64) with an aqueous liquid reaction mixture containing the main reactants in concentrations representing approximately desired steady state conditions, make-up streams of the respective reactants are supplied continuously at rates sufficient to produce the amounts of $ClO_2$ required. At the same time, chlorine gas is introduced via conduit 58, manifold 60, and sparger plates 62 and 64 under desired superatmospheric pressure and at a total rate equal to at least 10 mols per mol of $ClO_2$ being generated. However, the achievement of uniform steady state reaction rates requires that fairly precise material balances be maintained, not only on the major reactants, but also on non-reactants, such as diluents or solvents, in order to avoid significant variations in the peak concentrations of reactants. For this reason, a side stream diversion tap 44 is provided off recycle conduit 32 in FIG. 1 so that a minor amount of the recycling liquid reaction mixture can be drawn off through extension line 46 as needed in order to maintain desired material balances of water, metal cations (e.g. sodium), etc. This side stream can, of course, be treated (e.g. neutralized) for proper waste disposal. However, the sulfur values therein can generally be utilized in the pulp mill, e.g. in the black liquor section of a kraft process for the pulping of wood.

In this way, the make-up reactants can be readily supplied through their respective feed lines at rates equal to their rates of disappearance (whether by removal of a side stream via line 46 and/or by consumption in the ongoing reduction reaction occurring therein). Of course, it is still possible to maintain production rate and composition of the $Cl_2/ClO_2$ gas mixture generated even in the face of an inadvertent minor variation in a significant parameter. For example, the effect of a modest decline in the concentration of one or more of the major reactants might be offset by raising the temperature of the liquid reaction medium and vice versa.

The present process can be operated within a wide range of reactant concentrations as already indicated, e.g. in solutions between about 0.1 and 3.0 molar in $ClO_3^{31}$ and between about 4 and 14 normal in strong acid. However, for best results in terms of ease of control and a good balance among yields, production rates and overall efficiency, we prefer to operate at rather lean reactant concentrations, particularly with respect to chlorate and reducing agent. Thus, in our acidic reaction solution, the preferred equilibrium concentrations at steady state reaction conditions are generally somewhere within the range of about 0.05 to about 1.0 molar in both $ClO_3^-$ and $Cl^-$, and between about 6 and about 12 normal in strong acid. In our process, chloride ion generally functions as an effective reducing agent even when it is not the principal preformed reducing agent introduced. For example, other reducing agents of interest (primarily sulfur dioxide and possibly methanol) react with chlorine to form HCl or other sources of $Cl^-$. Indeed, in view of the large amounts of chlorine present in our system and the extremely fast reaction between $SO_2$ and $Cl_2$ in the presence of water, $Cl^-$ concentration is the most logical measure of available reducing agent herein. Within the above specified ranges of equilibrium reactant concentrations, excellent overall results are obtained by operating said process as described at pressures of at least 7 psig and temperatures below 100° C. Preferably, operating pressures will lie between about 2 and about 7 atmospheres absolute, with temperatures of between about 30° and about 80° C.

Significant proportions of by-product $Cl_2$ are usually formed in producing $ClO_2$ by reduction of acidic chlorate solutions, e.g. amounting to at least about 0.2 mols of $Cl_2$ per mol of $ClIO_2$, and typically between about 0.4 and 0.8 mols/mol when $Cl^-$ is the prevailing reducing agent. Accordingly, the molar (or volumetric) ratio of $Cl_2/ClO_2$ in the pressurized gaseous product generated in our process will always be at least somewhat greater than the molar ratio in which the pressurized chlorine gas is supplied from external tank 56. Thus, the volumetric $Cl_2/ClO_2$ ratio of the pressurized gaseous product herein will actually be in substantial excess of 10 to 1, and preferably between about 11/1 and about 99/1.

DESCRIPTION OF THE PREFERRED EMBODIMENTS

Figure 2:
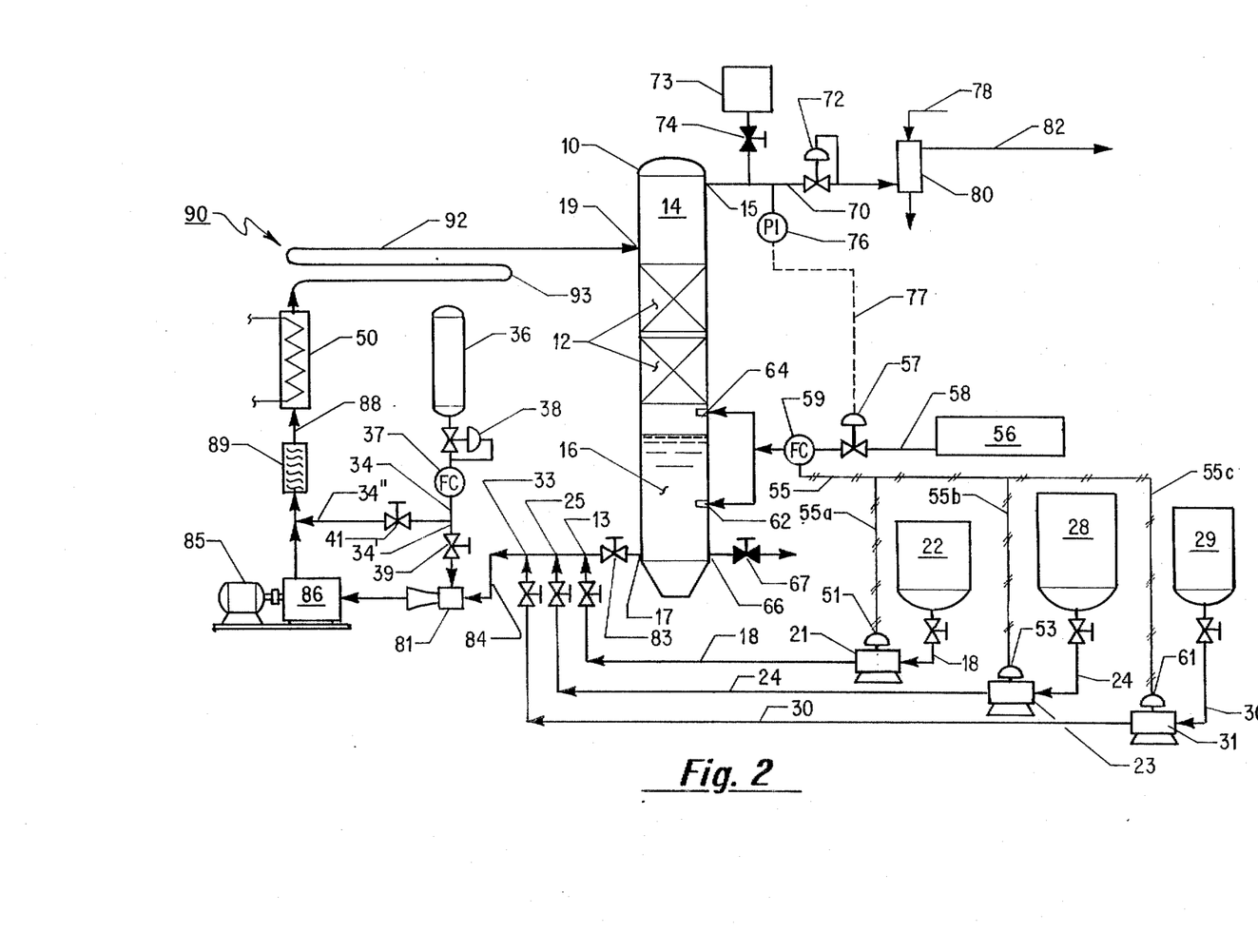
FIG. 2 is a schematic flow diagram depicting as preferred embodiments, certain unique, customized apparatus arrangements devised by us especially to achieve optimized performance of our process. Said diagram illustrates key interactive operational functions and relationships through which the several parts of this assembled apparatus cooperate to secure such superior performance, as will be described in detail hereinafter.

Referring next to FIG. 2, optimized modes of operating our process using a unique, customized apparatus arrangement are illustrated. In this drawing, an enclosed, columnar generator is provided in the form of vertical tower 10 constructed to withstand several atmospheres of pressure and having a packed section 12 in the medial region thereof. Packed section 12, which is at least 3 feet in height and preferably more, contains loosely packed inert solids of a size and shape suitable for effecting good gas/liquid contacting (e.g. various hollow shapes like rings, saddles, etc.). Space 16 in the bottom of tower 10 has a height of at least about 3 feet and preferably 4 or more, while free space 14 in the upper portion thereof has a height of at least about 2 feet, and preferably more. Near the bottom of space 16, tower 10 is fitted with liquid outlet port 17 (for recirculating spent reaction liquid therefrom), as well as discharge line 66 containing control valve 67. Through said line 66, a slip stream of spent liquor can be removed at a rate which maintains the material balance between water added (namely water in make-up solutions of the reactants plus by-product water from the reduction reaction) versus water removed (including the moisture content of the gaseous product generated and withdrawn). In the upper part of free space 14, tower 10 is also fitted with gaseous outlet port 15 connecting into product gas discharge conduit 70. In the lower part of free space 14, somewhat above the top of packed section 12, tower 10 is also equipped with fluid inlet port 19. Connected between liquid outlet port 17 and fluid inlet port 19 is an extensive circuitous loop 90 of pressure-tight, fluid handling conduit and auxiliary equipment, providing a continuous fluid passageway from outlet port 17 to inlet port 19.

The first leg of circuitous loop 90 is conduit section 84, which extends from liquid outlet port 17 to the inlet of pumping unit 86 and contains valve 83 slightly downstream of outlet port 17. Downstream of valve 83, conduit section 84 is also fitted with inlet connections such as 33, 25 and 13 for feeding fresh reactants to the process. Pumping unit 86 is a mechanical, fluid propulsion device having at least one rotational element suitably housed therein and mounted on a drive shaft coupled to a motor 85. The outlet from pumping unit 86 connects directly with the remainder of loop 90, which is shown in FIG. 2 as being formed of upward leg 88 followed by return leg 92, which connects back to inlet port 19 of tower 10. Leg 92 is shown as having hair-pin or serpentine sections 93, illustrating how the overall length of loop 90 (and the total retention time therein of the circulating reaction mixture) can be increased conveniently without consuming excessive plant space.

Pumping unit 86 must be carefully selected to provide an excellent combination of fluid propulsion actions enabling it to overcome all flow resistances (including static head, frictional losses, etc.) in loop 90 and maintain steady circulation of the reaction mixture therethrough. A single stage centrifugal or turbine pump having a multivaned impeller mounted in a properly fitted casing and adapted to operate at a modest net positive suction head is a good choice under most operating conditions. However, a multistage pumping unit is generally more advantageous, particularly when the process is operated at temperatures substantially higher than about 60° C. and/or at absolute pressures below about two atmospheres. For example, multistage units not only deliver increased pressurization, but also generate more turbulence and better mixing. Of course, regenerative type turbine pumping units represent ideal candidates for pumping unit 86 since they are essentially free of serious cavitation problems under the full ranges of temperature, pressure and operating conditions contemplated herein.

Several potentially helpful but normally non-essential items of accessory equipment are also illustrated in leg 88 of loop 90, namely heat exchanger 50 and static mixer 89. Supply means for a gaseous reducing agent, such as $SO_2$, is also shown in FIG. 2, comprising pressurized tank 36 and feed line 34 containing control valve 38 and flow control device 37. Feed line 34 is divided into two branches 34' and 34" containing stop valves 39 and 41 respectively so that any gaseous reducing agent employed can be introduced into the reaction mixture circulating through loop 90 before and/or after pumping unit 86. If gaseous reducing agent is to be introduced prior to pump 86, a suitable in-line gas/liquid mixing device, such as venturi jet mixer 81 should be included in leg 84 near the end thereof, and stop valve 39 in branch line 34' left open. If gaseous reducing agent is to be introduced after pump 86, branch line 34" connected to leg 88 at a point shortly above the outlet from pump 86 would be used with valve 41 left open. Preferably, in the latter case, an in-line static mixer 89 would be included immediately following the connection point of branch 34" with leg 88. Alternatively, branch line 34" could connect directly to a gas/liquid mixing device placed in leg 88, such as the venturi jet mixer 81 shown in leg 84. Leg 92 could also be provided with auxiliary items of equipment if desired. For example, a heat exchanger like 50 could be located in leg 92 instead of, or in addition to, such equipment in leg 88.

Tower 10 is also equipped with injection nozzles 62 and 64 located at two different levels for introducing pressurized chlorine gas from high pressure supply tank 56 via conduit 58 and manifold 60. Alternatively, sparge plates could be used instead of nozzles as shown in FIG. 1. Heaters (not shown) may be included to vaporize liquified chlorine and/or to increase the temperature of gaseous chlorine introduced. Conduit 58 contains pressure reducing valve 57 and flow control device 59 for regulating the pressure and feed rate of chlorine gas entering tower 10. Similarly, discharge conduit 70, connected to egress means for the pressurized gaseous product generated, contains gas sampling tap 74 (with collector 73), for use in analyzing said product, flow control valve 72 and (optionally) condenser 80 (used when desired to reduce moisture content of the pressurized gaseous product before delivery of same through extension conduit 82 to its end use application).

At steady state operation of the optimized arrangement as shown in FIG. 2, relatively rich, make-up solutions of the main reactants are continuously introduced into the stream of spent reaction liquid being circulated through loop 90 soon after it enters initial leg 84. Thus, sulfuric acid solution from tank 22, sodium chlorate solution from tank 28 and hydrochloric acid solution from tank 29 are introduced into said spent reaction liquid via inlet connections 13, 25 and 33 respectively. Since said reactants must be introduced at carefully controlled rates to compensate for their disappearance via both the chlorate reduction reactions and in the slip stream of spent reaction mixture removed through discharge line 66 and to maintain desired $ClO_2$ production rates, the rich make-up solutions are supplied from tanks 22, 28 and 29 through feed lines 18, 24 and 30 via metering pumps 21, 23 and 31 respectively.

Said metering pumps 21, 23 and 31 are preferably simplex pumps of the reciprocating plunger type wherein pressurized oil is forced by the plunger in precise amounts into one side of a diaphragm-partitioned chamber thus displacing (with the aid of suitable check valves) equal volumetric amounts of the reactant fluid on the other side of said diaphragm. However, any type of accurate metering or proportioning pumps can be used which dependably control the flow rate of the reactant solutions fed. Ideally, metering pumps 21, 23 and 31 are equipped with pneumatically controlled stroke adjustment means 51, 53 and 61, interacting with the reciprocating plunger elements therein. A pneumatic signal, derived from flow control device 59 and proportional to the measured flow rate of the pressurized chlorine gas fed to the process, is then transmitted via main line 55 and branch lines 55a, 55b and 55c (containing suitable proportional controllers not shown) to said stroke adjustment means 51, 53 and 61 respectively. In this way, the feed rates of the main reactants can be immediately adjusted proportionately in direct response to measured changes in feed rate of pressurized chlorine gas. This is an important optional feature since it permits the output of the present process to be promptly adjusted to match even rather sudden changes in the amount of gaseous product needed, which may occur in the particular treatment facility which is being supplied thereby. Similarly, if a change in $Cl_2/ClO_2$ ratio of the pressurized gaseous product mixture is desired, it can easily be effected by merely making appropriate adjustments in the setpoints of the proportional control devices (not shown) in pneumatic signal lines 55a, 55b and 55c.

On top of the close process control and improved efficiency obtained, many additional major advantages also flow from the use of the customized apparatus arrangement of FIG. 2. Especially noteworthy are the relatively high production rate of $ClO_2$ achieved in a very compact apparatus assembly under exceptionally flexible operating conditions and the quickness of response in correlating production rates, product gas compositions, etc., as needed (in order to match up with changes in operating rates or other conditions of the end-use application to which the gaseous $Cl_2/ClO_2$ product is directly supplied). The primary features of the present invention mainly responsible for these special advantages are as follows:

(1) The selective introduction of the concentrated make-up solutions of all major reactants into the stream of partly spent liquid reaction medium as it flows through the first part of extensive circuitous loop 90 and the selective introduction of the large volume of pressurized chlorine gas into the lower medial part of tower 10;

(2) Maintenance of substantial superatmospheric pressure throughout both loop 90 and tower 10; and (3) The provision of packed section 12 in the upper medial part of tower 10 and above the highest level of introduction of the pressurized chlorine gas, all of which is introduced at points substantially higher than liquid outlet 17.

Thus, the combination of features recited above enables loop 90 to serve as a very effective primary reaction zone in spite of the relatively small total volume thereof relative to the space inside of tower 10 and the limited residence time provided for the reaction mixture passing therethrough, which is typically in the order of several seconds (e.g. only about 5 to 30 seconds), compared to several minutes at least in tower 10. To this end, feature (1) maximizes the reaction rate in loop 90 by establishing the peak concentrations of the major reactants near the beginning thereof, while features (2) and (3) maximize the residence times of the flowing mixtures within a given sized loop, e.g., by minimizing the gas phase volume in said flowing mixtures due to increased solubility of gases in liquid at higher pressures and the reduced volume of any separate gas phase that is present. Of course, the introduction of the chlorine gas to tower 10 in such a way as to guard against its being swept into loop 90 in the gaseous phase also helps to minimize total gas volume within the reaction mixture flowing through loop 90.

As previously indicated, neither of the equilibrium concentrations of chlorate or chloride in the partly spent reaction liquid should exceed about 1.0 molar. Preferably, said partly spent liquid is substantially leaner in both, e.g., between about 0.05 and about 0.6 molar in chlorate and about 0.05 to about 0.3 molar in chloride. These preferred ranges are especially significant in connection with operating the customized compact embodiment of FIG. 2 to realize its full potential in terms of flexibility and fast response in effecting changes in production rate and/or product composition, while maintaining good overall efficiency and economics.

Another important consideration in securing optimum results from our customized embodiment is the relation between the final or equilibrium concentration of chlorate in the spent liquid at the bottom of tower 10 and the initial or peak concentration of chlorate in the liquid reaction mixture (i.e., just after rich make-up solutions of reactants have been introduced in leg 84). In most cases, the initial concentration of chlorate should not exceed 2 molar. Furthermore, when the equilibrium chlorate concentration is in the preferred range (i.e. below about 0.6 molar), initial chlorate concentration should not substantially exceed about 1 molar.

Based upon the above considerations, the preferred initial chlorate concentrations in the enriched reaction liquid in leg 84 of FIG. 2 are between about 0.1 and about 0.9 molar, with the sub-range of between about 0.25 and about 0.75 molar being optimum in most situations. The preferred initial concentration of chloride ion will usually bear a significant relationship to the amount of chlorate to be reduced (i.e. to the difference between the initial and final chlorate concentrations) unless a major proportion of reducing agent other than chloride ion is employed. However, an initial chloride ion concentration of at least about 0.05 molar is recommended even when supplemental reducing agents (e.g. $SO_2$) are used in substantial proportions. Since the molar decrease in chlorate concentration effected is seldom much more than about 0.4 in our optimized reduction scheme, the equivalent chloride concentration theoretically required to reduce said chlorate is not much greater than 0.4 molar. However, excess available chloride ion over the theoretical amount stoichiometrically required has been found to be a definite advantage in achieving good conversions in our compact apparatus (at least about 5%, and preferably about 10% to about 30%, excess being recommended, but more than about 40% being unwarranted in most cases). Accordingly, the preferred range of initial chloride ion concentrations in our FIG. 2 embodiment is generally between about 0.05 and about 0.6 molar, with the sub-range of about 0.1 to about 0.4 molar being favored in most cases. Of course, when substantial proportions of $SO_2$ are used, the equivalent amount of $Cl^-$ formed by its reaction with $Cl_2$ should be taken into account in selecting the proportions of preformed $Cl^{-\text{ introduced in make-up solutions}}$.

Provided that the enriched reaction liquid formed in leg 84 of FIG. 2 is within the range of about 4 to about 14 normal in strong acid, the exact initial concentration thereof is not so critical as in the case of the chlorate and chloride ions. However, optimum overall results are generally obtained when the initial concentration of strong acid is between about 6 and about 12 normal.

In effect, the arrangement of FIG. 2 provides three distinct reaction zones, each of which under the conditions specified above, contribute substantially in accomplishing the desired reduction reaction by which the $ClO_2$ is generated In their functional sequence, these zones are as follows: (1) the elongated fluid passageway in loop 90; (2) the packed section 12 in tower 10; and (3) the reservoir of reaction liquid in space 16 at the bottom of tower 10. The length of loop 90 is usually about 2 to 8 times the overall height of tower 10 (more typically about 3 to 6 times), while the cross-sectional area of tower 10 is always many times as great as that of the fluid handling conduit making up the bulk of loop 90 (e.g. from about 25 to about 250 times as great, and preferably between about 50 and 150 times).

The residence time of the reaction liquid in each of reaction zone (1) (i.e., loop 90) and reaction zone (2) (i.e., packed section 12) is generally considerably less than 1 minute, whereas the average residence time in reaction zone (3) (i.e., reservoir space 16 of tower 10) is at least about 1 minute, and usually more (e.g. between about 2 and about 30 minutes, and preferably from about 2 to about 15 minutes). Although the residence time in reaction zone (3) is at least several times that in reaction zone (1), e.g. normally about 5 to about 30 times as long, the proportion of the overall chlorate reduction reaction achieved which can be effected in zone (1) is still quite significant and can even approach the proportion effected in zone (3).

Figure 3:
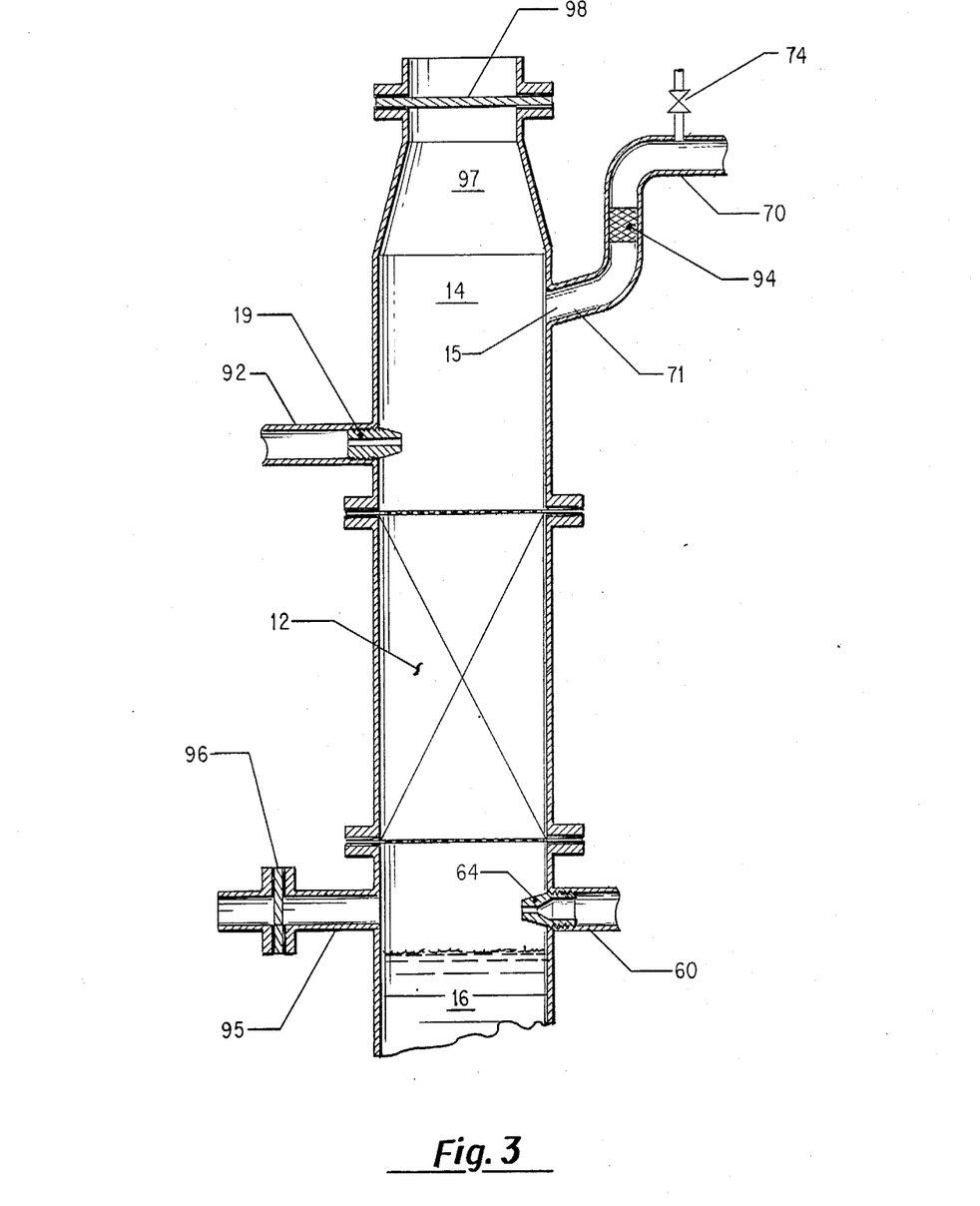
FIG. 3 is a vertical sectional view of the upper part of a $Cl_2$–$ClO_2$ generator tower like that in FIG. 2, in which certain additional improved apparatus features are incorporated.

Referring now to FIG. 3, an enlarged sectional view of the upper part of a generator tower (like tower 10 in FIG. 2) is shown in order to illustrate how certain additional apparatus improvements can be incorporated for special purposes. The modifications and improvements added in FIG. 3 include special safety features and means for promoting separation from the gaseous product of any entrained liquid phase carried over therewith into discharge conduit 70.

More specifically, a safety discharge line 95 containing rupture disk 96 across same has been connected through the side wall of tower 10 at a level between packed section 12 and liquid reservoir space 16. Likewise, bonnet section 97 containing rupture disk 98 across the open top portion thereof has been placed atop tower 10 in open communication with space 14.

Finally, the means for promoting separation of any entrained liquid entering gaseous discharge conduit comprises mainly the double-elbow-shaped fitting 71, which connects egress port 15 from tower 10 to discharge conduit 70 in FIG. 3. Although the lower arm of fitting 71 is shown as being inclined slightly upwards from the horizontal, it could also be substantially horizontal. In either case, the vertical section of fitting 71 preferably contains a demister screen 94 (or similar liquid disengaging device) mounted across the internal passage therein.

The following specific operating examples are included here in order to illustrate additional working details and considerations involved in successfully practicing preferred embodiments of the present invention. However, said examples should not be construed as implying critical limitations as to the useful scope of our invention.

EXAMPLE 1

This example describes the manufacture of a pressurized gaseous mixture of $Cl_2$ and $ClO_2$ having a molar $Cl_2/Cl_O$ ratio of about 25 to 1, using an apparatus basically arranged as in FIG. 2 but omitting most of the optional features therein. Thus, the feedback control systems to and from chlorine feed line 58 are lacking, and the only auxiliary equipment included in circuitous loop 90 is pumping unit 86 and heat exchanger 50. The vertical tower 10 has internal dimensions of about 6 inches in diameter and about 10 feet in height and contins packed section 12, about 3.5 feet in height, the top of which is about 2.5 feet below the top of the tower. Circuitous loop 90 is formed from one-half-inch schedule 80 piping having a total length of about 40 feet.

A 22-liter pool of acidic aqueous sodium chlorate solution approximately representative of desired equilibrium reaction liquid at steady state conditions (namely about 3.7 molar in $H_2SO_4$ and about 0.42 molar in $NaClO_3$) is established in reservoir section 16, filling the bottom part (ca. 4 feet) of tower 10. This solution is then circulated through loop 90 via pumping unit 86 at approximately the planned recycle rate (10.8 liters/minute) while adding or subtracting heat via heat exchanger 50 as needed to adjust the temperature to about 50° C. At this point actual production of a pressurized gaseous mixture is started by feeding chlorine gas from high pressure supply tank 56 through line 58 and reducing valve 57 to manifold 60 and injection nozzles 62 and 64 at a pressure of about 35 psig and a total flow rate of about 1,775 grams (25 g. mols) per minute, while at the same time introducing concentrated aqueous solutions of the reactants needed to generate $ClO_2$ at inlets 33, 25 and 13. Thus, per minute 120 ml. of 96% by weight (18 molar) $H_2SO_4$, 240 ml. of 48.2% by weight (6.5 molar) $NaClO_3$, and 142 ml. of 31.5% by weight (10 molar) HCl are introduced respectively at said inlets. A minute or two later, the removal of a balancing stream of spent reaction liquid is initiated at a rate of 365 ml./minute through discharge line 66. Removal of this slip stream not only maintains the liquid volume of the system, but also limits the ultimate concentration of by-product sodium sulfate reached in said liquid as well (so as to avoid formation of a solid phase therein).

After 10 to 12 minutes of continuous operation, thermal effects are under sufficient control to maintain a temperature of about 50° C. in reservoir section 16, while the pressure reading in the median section of tower 10 is fairly regular at about 30 psig. During the remainder of the run, a steady stream of gas is removed through discharge conduit 70 at a pressure of about 25 psig. The proportion of $ClO_2$ in the product gas averages about 4% by volume, as determined by prompt iodometric titration of cold water solutions resulting from absorption of the $ClO_2$ in the gas generated during a measured interval of time. Analysis of the slip stream removed through line 66 during the main (stable) period of the run shows an equilibrium concentration of about 0.44 mols/liter of $Na_2ClO_3$ therein. These analyses indicate the attainment of an efficiency of about 79% in terms of the $ClO_2$ generated based upon the net amount of $NaClO_3$ fed (i.e. that added in make-up solution less that removed in slip stream).

EXAMPLE 2

Using the same equipment arrangement and general operating procedures as described in Example 1, generation of a pressurized gaseous mixture of $Cl_2$ and $ClO_2$ in a somewhat lower ratio of $Cl_2/ClO_2$ is carried out under the following conditions.

The initial 22-liter pool of aqueous sodium chlorate stablished in tower 10 is somewhat richer in reactants, namely about 4.5 molar in $H_2SO_4$ and about 0.53 molar in $NaClO_3$. Also, the operating temperature is adjusted and maintained at about 55° C. instead of 50° C., but the pressure is controlled as in Example 1. Finally, the chlorine feed rate is maintained at 1,775 grams per minute; but, just before it is initiated, about 48 ml. of 10 molar hydrochloric acid is mixed into the 22-liter pool of solution to provide a small excess of chloride ion (ca. 20% more than that supplied by the make-up solution of HCl).

The resulting gaseous product in this case averages about 4.4% $ClO_2$ by volume, while the slip stream of spent reaction liquid removed through line 66 contains an equilibrium concentration of $NaClO_3$ of about 0.54 mols/liter, indicating an efficiencey of about 90% in converting the net amount of $NaClO_3$ fed to $ClO_2$.

Various substitutions can be made in the above examples in accordance with the explanatory disclosures contained in the general descriptions of our inventions provided previously herein. For example, sulfur dioxide can be substituted for some, a major portion, or substantially all of the preformed chloride ion specified above, by using an effective gas/liquid mixer such as 81 to introduce same, as illustrated in FIG. 2.

The pressurized gaseous mixtures of $Cl_2$ and $ClO_2$ obtained herein offer tremendous commercial advantages in the modern technology of bleaching cellulosic fibers, particularly wood pulps. Thus, said mixtures are ideally fitted for direct introduction into various bleaching stages, especially chlorination/delignification treatments. For example, the ability to feed and incorporate said $Cl_2/ClO_2$ mixture directly into wood pulps without use of a water injection system is of major significance in view of the current emphasis upon operating bleaching stages at as high consistencies as possible.

This invention has been described with respect to representative illustrative embodiments, but it is evident that one of ordinary skill in the art can employ alternatives or make equivalent substitutions without departing from the spirit or scope of the invention as defined in the appended claims.

We claim:

1. In a method of generating chlorine dioxide from inorganic chlorate by chemically reducing same in an aqueous solution of $H_2SO_4$ having an acid normality of at least about 4, the improvement which comprises conducting said reducing reaction at a temperature of less than 100° C. under a superatmospheric pressure of more than half an atmosphere in the absence of inert sweep gases while continuously feeding substantially pure, pressurized chlorine gas thereto in proportions to yield a superatmospheric pressurized effluent gaseous product at an absolute pressure of at least 1.5 atmospheres consisting essentially of a mixture of chlorine and chlorine dioxide in volumetric $Cl_2/ClO_2$ ratios greater than about 10/1, enabling said gaseous product to be transferred directly to a continuous industrial process operating above atmospheric pressure.

2. An improved method as in claim 1, wherein said reducing reaction is conducted under an absolute pressure of between about 2 and about 6 atmospheres and at a temperature of between about 30° C. and about 80° C.

3. An improved method as in claim 2, wherein chloride ion is introduced from an external source and/or is formed in situ in proportions sufficient to reduce the majority of the inorganic chlorate consumed.

4. An improved method as in claim 2, wherein gaseous sulfur dioxide is introduced from a separate external source in proportions which are stoichiometrically sufficient to provide a significant fraction of the total reducing agent required for reduction of the inorganic chlorate consumed.

5. An improved method as in claim 3 wherein said aqueous solution is between about 6 and about 12 normal in $H_2SO_4$, about 0.05 to about 1 molar in chlorate and at least about 0.05 molar in chloride ion.

6. An improved method as in claim 5, wherein the chloride ion concentration is between about 0.05 and about 1.0 molar.

7. An improved method as in claim 1, wherein said superatmospheric pressurized gaseous product contains between about 1% and about 8% $ClO_2$ by volume, with the remainder consisting essentially of $Cl_2$, except for a minor amount of water vapor.

8. An improved method as in claim 7, wherein said pressurized gaseous product is continuously produced at an absolute pressure of at least 2 atmospheres and is directly introduced into a continuously operated wood pulp bleaching stage.

9. An improved method as in claim 8, wherein said gaseous product is injected directly into an aqueous suspension of wood pulp passing through said stage.

10. An improved method as in claim 9, wherein said stage is a delignification treatment.

11. In a process for generating mixtures of chlorine dioxide and chlorine by chemically reducing inorganic chlorate in an aqueous solution which is at least about 4 normal in sulfuric acid and which is supplied with chloride ion at a rate sufficient to provide a major portion of the chemical reducing agent serving to reduce said chlorate, the improvement which comprises conducting said process below about 80° C. and at superatmospheric pressure of at least about 2 atmospheres absolute by continuously feeding substantially pure chlorine gas from high-pressure external source into intimate contact with said aqueous solution in volumetric proportions equal to between about 10 and about 99 times the rate of formation of chlorine idoxide from said chemical reduction reaction while excluding inert sweep gases and withdrawing as finished product at an absolute pressure of over 1.5 atmospheres a gaseous mixture having a volumetric $Cl_2/ClO_2$ ratio of between about 11/1 and about 99/1, enabling it to be transmitted directly to a pressurized zone for treating wood pulp and introduced thereto under its own pressure.

12. An improved process as in claim 11, wherein the temperature is between about 30° C. and about 80° C. and said aqueous solution is between about 6 and about 12 normal in $H_2SO_4$ and, at steady state, contains equilibrium concentrations of about 0.05 to about 0.6 mols of chlorate per liter and about 0.05 to about 0.3 mols of chloride ion per liter.

13. A process as described in claim 12, wherein said aqueous solution is maintained at steady state by continuously introducing make-up streams more concentrated in each of the respective reactants, i.e. $H_2SO_4$, $ClO_3^-$—and $Cl^-$—and continuously removing a slip stream of the partly spent solution in proportions such as to maintain a balance on the equilibrium concentrations of all components, including water, by-products and reactants.

14. A process as described in claim 13 wherein:
(a) said aqueous solution is maintained mostly as a pool filling a major lower part of an enclosed columnar reaction zone;
(b) said solution is continuously circulated by means of a suitable fluid propulsion device through an enclosed elongated tubular shaped reaction zone which forms a connecting loop between an outlet near the bottom of said columnar reaction zone and a fluid inlet located in the upper part of said columnar reaction zone at a level well above the upper level of said pool so as to leave an effective gas/liquid contacting zone in the part of said columnar reaction zone just above said pool;
(c) said make-up streams of reactants are metered into said circulated solution as it flows through the part of said elongated tubular shaped reaction zone which precedes said fluid propulsion device;
(d) introducing the chlorine gas from said external source into said columnar reaction zone below said gas/liquid contacting zone; and (
e) removing said finished product gaseous mixture from near the top of said columnar reaction zone through an outlet located at a level substantially above the level of said fluid inlet described in (b).

15. A process as in claim 14, wherein the rate of removal of the solution from the bottom of said columnar reaction zone for circulation through said elongated tubular shaped reaction zone is much larger than the combined rates of addition of the make-up streams of reactants metered into said solution per step (c).

16. An improved process as in claim 11 wherein said chemical reducing agents are limited to inorganic species, in order to insure that the product is a pressurized gaseous mixture substantially free of inert carrier gases, and the chlorine gas is fed to the process at a pressure sufficient to maintain an absolute pressure of at least 2 atmospheres in said pressurized gaseous product enabling it to be injected substantially devoid of inert gases directly into a continuously operated stage for treating wood pulp.

17. An improved process as in claim 16, wherein said stage involves delignification treatment of said wood pulp.

18. A process as described in claim 14 where said fluid propulsion device in step (b) also serves as a repressurizing force sufficient to overcome substantially the entire pressure drop through said elongated tubular shaped reaction zone.

19. A process as in claim 18 wherein said fluid propulsion device includes at least one mechanically driven, regenerative turbine stage.

20. A process as in claim 18 wherein said fluid propulsion device is a multi-stage unit.

* * * * *